(12) United States Patent  
Chitouras (10) Patent No.: US 7,175,725 B2  
(45) Date of Patent: *Feb. 13, 2007

(54) APPARATUS AND METHOD FOR MODIFYING TONER CARTRIDGES FOR SEALING

(76) Inventor: Costa G. Chitouras, 10 Packard Ave., Somerville, MA (US) 02144

( * ) Notice: Subject to any disclaimer, the term of this patent is extended or adjusted under 35 U.S.C. 154(b) by 441 days.

This patent is subject to a terminal disclaimer.

(21) Appl. No.: 10/454,139

(22) Filed: Jun. 3, 2003

(65) Prior Publication Data

US 2003/0205311 A1 Nov. 6, 2003

Related U.S. Application Data

(63) Continuation of application No. 09/627,888, filed on Jul. 28, 2000, now Pat. No. 6,596,110.

(60) Provisional application No. 60/148,065, filed on Aug. 10, 1999.

(51) Int. Cl.
*B32B 35/00* (2006.01)
*G03G 15/06* (2006.01)

(52) U.S. Cl. .......................... 156/94; 156/98; 156/254; 156/268; 156/293

(58) Field of Classification Search ................ 156/94, 156/98, 254, 257, 268, 293; 29/402.02, 402.04, 29/402.01, 402.03, 426.6; 83/51, 870, 871, 83/872, 873, 874

See application file for complete search history.

(56) References Cited

U.S. PATENT DOCUMENTS

| 1,407,692 | A | 2/1922 | Kuhn et al. |
|---|---|---|---|
| 3,325,332 | A | 6/1967 | Cleereman |
| 3,897,296 | A | 7/1975 | Waldrum |
| 3,999,654 | A | 12/1976 | Pollack |
| 4,139,760 | A | 2/1979 | Banks |
| 4,342,282 | A | 8/1982 | Yamashita et al. |
| 4,504,353 | A | 3/1985 | Ford |
| 4,538,651 | A | 9/1985 | Lykins |
| 4,615,608 | A | 10/1986 | Mizutani |
| 4,862,210 | A | 8/1989 | Woolley |
| 4,930,684 | A | 6/1990 | Patterson |
| 4,933,036 | A | 6/1990 | Shaposka et al. |
| 4,971,639 | A | 11/1990 | Quinn et al. |
| 4,981,218 | A | 1/1991 | Ban et al. |
| 5,080,745 | A | 1/1992 | Paull |
| 5,126,720 | A | 6/1992 | Zhou et al. |
| 5,184,182 | A | 2/1993 | Michlin |
| 5,223,068 | A | 6/1993 | Baley |

(Continued)

FOREIGN PATENT DOCUMENTS

EP 0 627 672 A2 12/1994

(Continued)

*Primary Examiner*—Justin R. Fischer
(74) *Attorney, Agent, or Firm*—Hamilton, Brook, Smith & Reynolds, P.C.

(57) ABSTRACT

A method for preparing a toner cartridge for reconditioning and resealing with a replacement seal includes providing a used toner cartridge whose seal has been removed and the toner essentially consumed with the cartridge substantially otherwise intact. The interior of the cartridge is partially separated or penetrated so as to remove, modify or by-pass any impediments present which would or could interfere with the resealing of the cartridge. A new seal is secured to the toner cartridge.

10 Claims, 7 Drawing Sheets

U.S. PATENT DOCUMENTS

| | | |
|---|---|---|
| 5,258,814 A | 11/1993 | Davies |
| 5,267,003 A | 11/1993 | Grappiolo |
| 5,282,003 A | 1/1994 | Michlin |
| 5,296,902 A | 3/1994 | Michlin |
| 5,335,831 A | 8/1994 | Foster |
| 5,339,596 A | 8/1994 | Cohen |
| 5,345,207 A | 9/1994 | Gebele |
| 5,370,761 A | 12/1994 | Chitouras |
| 5,407,518 A | 4/1995 | Baley, Jr. |
| 5,460,674 A | 10/1995 | Chitouras |
| 5,525,183 A | 6/1996 | Baley |
| 5,531,846 A | 7/1996 | Miraglia et al. |
| 5,534,836 A | 7/1996 | Schenkel et al. |
| 5,657,678 A | 8/1997 | Cohen |
| 5,676,794 A | 10/1997 | Baley |
| 5,799,712 A | 9/1998 | Kelly et al. |
| 5,876,541 A | 3/1999 | Chitouras |

FOREIGN PATENT DOCUMENTS

| | | |
|---|---|---|
| WO | WO 92/10404 | 6/1992 |
| WO | WO 01/11434 A1 * | 2/2001 |

* cited by examiner

APPARATUS AND METHOD FOR MODIFYING TONER CARTRIDGES FOR SEALING

RELATED APPLICATION

This application is a continuation of U.S. application Ser. No. 09/627,888, filed Jul. 28, 2000, now U.S. Pat. No. 6,596,110, issued Jul. 22, 2003, which claims priority to U.S. Provisional Application No. 60/148,065, filed on Aug. 10, 1999. The entire teachings of the above applications are incorporated herein by reference in their entirety.

BACKGROUND OF THE INVENTION

This invention relates generally to a method for preparing a toner cartridge for reconditioning and resealing the toner cartridge with a seal. The toner cartridges include the type used in laser printers, especially those in which the toner cartridge contain not only the toner or powder but also the ionizing means and photoreceptor drum in one package. The original seal design lends itself to lower cost maintenance of the printer or copying machine but significantly higher costs for replacing consumed toner.

While it is easy to remove the cartridge in a typical machine, and in fact this must be done in order to install a new cartridge, one would think most people would opt to refill their cartridges by adding toner themselves. Such is not the case, however, with most office personnel avoiding this task, if for no reason other than the difficulty of containing the inadvertent spilling of some of the toner, and the resultant soiling of hand, clothing and immediate surroundings. The spilling of toner is also the reason a seal must be provided if the cartridge is to be shipped or held in any position except in the normal or upright position. A simple, stiff, push-in, pull-out plastic seal is sometimes adequate, especially if hand or local delivery of the refilled cartridge is contemplated. However, this type of seal will not prevent toner spilling under even normal handling of a well packaged toner cartridge handled by postal or shipping organizations.

One difficulty with resealing is that impediments are placed in the toner cartridge by manufacturers to prevent resealing by toner cartridge reconditioners. The impediments can include a difference in the level of the sealing surface or a pin or post to block a resealing insertion tool. One method that avoids the impediments requires the complete splitting of the shell of the cartridge, often requiring extensive reworking of the mating surfaces, replacing and cementing a new styrene or similar gasket which provides the surface to which the new pull-tab seal is ultimately adhered to, and an adherence of a "U" shaped, thin plastic seal via pressure sensitive adhesive. The split shells of the cartridge are then recemented and other, time-consuming adjustments on other components of the cartridge are performed to make it functional. Because of the high cost of splitting and reassembling these cartridges and the inevitable deterioration of the appearance of the finished toner cartridge, other ways have been sought for refilling these cartridges, to take full advantage of the potential price differential of new cartridges and those that have been refilled. Usually, the other expensive components that make up a complete toner cartridge are, in general, in excellent condition and capable of performing well for at least a few refillings of the cartridge. Also, the lifetime of a printer and use thereof is such that the costs of toner cartridges, in general, often exceed the cost of the printer. Therefore, a need exists for an improvement method to overcome the problems described above.

SUMMARY OF THE INVENTION

The invention comprises a method for preparing a toner cartridge for reconditioning and resealing with a seal. A used toner cartridge is provided whose seal has been removed and the toner essentially consumed with the cartridge substantially otherwise intact. The interior of said cartridge is partially separated or penetrated so as to remove, modify or bypass any impediments present which would or could interfere with the resealing of the cartridge. A new seal is secured to the toner cartridge.

In another embodiment, a toner cartridge having a toner seal removed from an original seal position is provided. The toner cartridge includes the original seal position in a different plane from an insertion point for a replacement seal insertion tool into the toner cartridge. The replacement seal is inserted with the replacement seal insertion tool into the toner cartridge. The insertion tool includes a blade having a first portion of the blade in a first plane and a second portion of the blade in a second plane that is different from the first plane. The replacement seal insertion tool is removed from the toner cartridge while leaving the replacement seal attached in a sealing position, thereby sealing the toner cartridge.

In a further embodiment, a used toner cartridge having a seal removed from an original seal position is provided. An impediment is removed in the used toner cartridge without fully splitting the toner cartridge. The impediment interferes with the insertion of a replacement seal insertion tool into the toner cartridge for resealing with a replacement seal. The replacement seal is inserted with the replacement seal insertion tool into the toner cartridge. The replacement seal insertion tool is removed from the toner cartridge while leaving the replacement seal attached in a sealing position, thereby resealing the toner cartridge.

This method for resealing toner cartridges provides for the recharging of toner cartridges at a lower cost, greater convenience, and reliability than is presently possible with known resealing methods. Thus, a user can be provided with a refilled cartridge which is essentially identical in appearance to the manufacturer's original seal, including the peripheral application of adhesive on the seal.

DETAILED DESCRIPTION OF THE INVENTION

The features and other details of the methods and apparatus of the invention will be described with reference to the accompanying drawings. The same numeral in different figures represents the same item. It will be understood that the particular embodiments of the invention are shown by way of illustration and not as limitations of the invention. This invention is most advantageously used with a sealing system that could not normally be used if the impediments were not removed or their effects mitigated. The principle features of this invention can be employed in various embodiments of cartridges, normally using a variety of special tooling designed for a specific cartridge, without departing from the scope of the invention.

The basic techniques for practicing this invention primarily utilize a partial opening of a cartridge without splitting the cartridge, or, a drill-or-mill cutter penetration of the cartridge in the areas where impediments prevent the insertion of a seal. The impediments are then removed and their effects eliminated, or, sufficiently reduced, so that a seal can be inserted and the cartridge sealed. The basic procedure of partially splitting or similar form of penetrating a cartridge and modifying it to allow the insertion of a seal has the significant advantage of essentially preserving the structural integrity and dimensional tolerances of the original cartridge. This is not the case when a cartridge is split and separated. Additionally, a partial splitting generally retains the low costs associated with inserting seals when the same cartridge is sealed a second or more times since the impediments need no longer be removed. Since the location and degree of the partial opening of a cartridge to remove impediments, and the tools preferred to carry out these functions are specific to a particular cartridge design, diagrams and descriptions of some useful tools as they apply to particular cartridges will be shown below.

Figure 1:
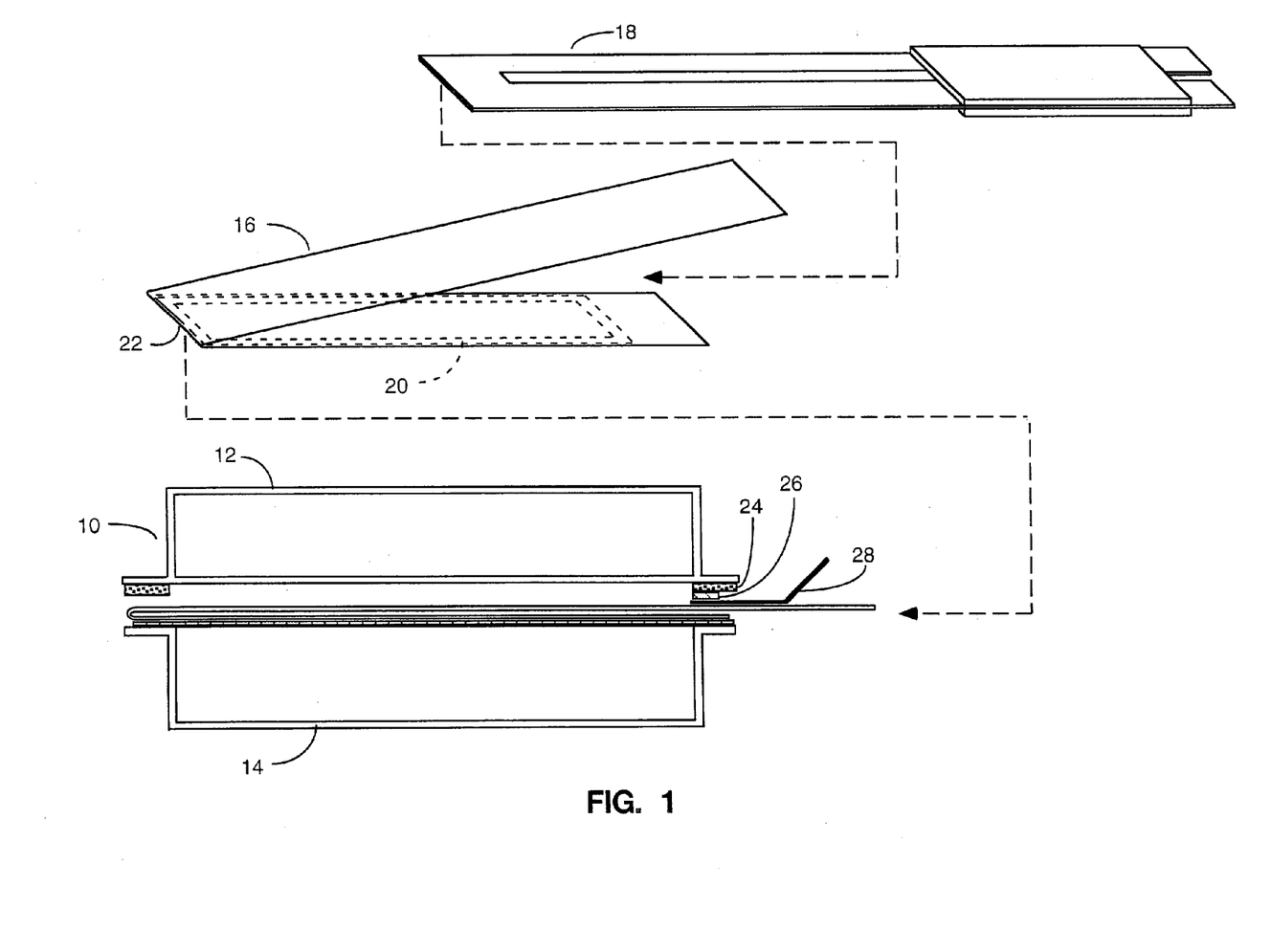
FIG. 1 is a schematic illustration of the steps of inserting a folded plastic strip having an adhesive pattern thereon and suitable for forming a seal with an insertion and/or sealing tool useful for inserting the plastic strip and forming a seal in a toner cartridge.

FIG. 1 illustrates a simplified cross section of a toner cartridge 10, which is typical of the first two toner cartridges produced in volume of the all-in-one designs, such as the Canon CX and SX cartridges. These cartridges either had no impediments or impediments that were readily bypassed. The cartridge has an upper section, usually referred to as a magnetic (mag) roller section 12, housing many of the critical components, such as the magnet roller, doctor blade, charging means and photoreceptor drum. The lower section, primarily carrying the toner and sealed with a user-removable seal, is commonly referred to as the toner section 14. When a used toner cartridge is to be resealed, a seal 16 can be inserted into cartridge 10 with the aid of an insertion tool 18. Seal 16 can be an insertable heat seal, as described in U.S. Pat. Nos. 5,370,761, 5,460,674 and 5,876,541, the entire teachings of each are incorporated herein by reference. These seals are available from Provide Technologies, Inc., 10 Packard Avenue, Somerville, Mass. 02144 U.S.A. A hot melt adhesive 20 is on the lower portion of seal 16, which is folded at 22 at the end of insertion tool 18 prior to insertion. Mag roller section 12 has attached to it at least one foam gasket 24, which has attached to and partially covering it plastic tape 26. Plastic tape 26 can be the first impediment that was introduced to hinder the insertion of a seal with an insertion tool by presenting a thin edge of material that the seal-tool combination snagged (adversely affecting the foam gasket 24 performance) when being inserted into the cartridge 10. This impediment is successfully bypassed with the use of a foam protector 28, shown in FIG. 1, inserted under the plastic tape 26, prior to the seal-tool combination being inserted.

A thin (typically 0.005 inch (0.127 mm)) hardened steel foam protector 28 is readily inserted into the cartridge without snagging the plastic tape 26, prior to the seal-tool being inserted. The seal 16 is slipped under the foam protector 28 and plastic tape 26 (with the use of insertion tool 18) without snagging plastic tape 26. Snagging plastic tape 26 will likely destroy the sealing performance of the foam gasket 24, whose function is to prevent toner from leaking out of the cartridge opening when the cartridge is used in a printer. After a seal 16 is inserted into a cartridge 10, insertion tool 18 is electrically heated, melting the hot melt adhesive 20 which, upon cooling, bonds to the sealing surface within the cartridge 10, sealing the cartridge.

Figure 2:
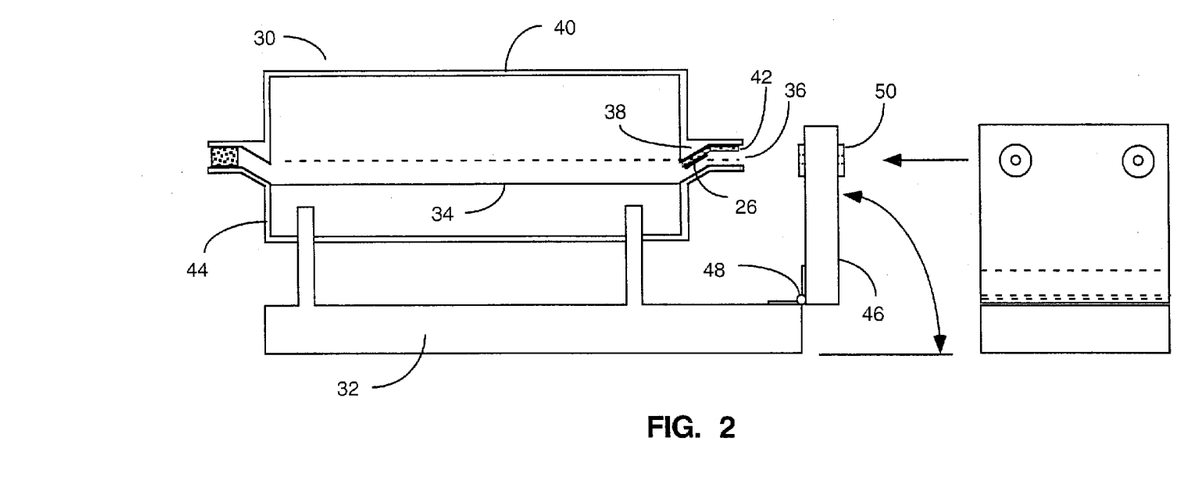
FIG. 2 is a schematic cross-sectional illustration of a second cartridge and a drilling jig.

FIG. 2 shows a simplified cross-section of a newer-style cartridge 30 (e.g., similar to the 4000 series), supported by cartridge holder 32. There are two major impediments to the insertion of a seal in contrast to the original cartridge design shown in FIG. 1. The first impediment is a difference in the level of the sealing surface 34, a surface not in line with the seal entrance 36, schematically shown as a dotted line. The second impediment is the addition of a molded extension 38, to the mag roller section 40 which forces foam gasket 42 to follow the "step-down" contour determined by molded extension 38. The insertion of a tool and seal through the seal entrance 36 requires that either the molded extension 38 be removed, or, more practically, mag roller section 40 and toner section 44 be partially split and the opening enlarged to allow entrance of the tool and seal.

One preferred embodiment of partially splitting this cartridge is with the use of a precision drill jig 46, which can be firmly and accurately hinged to cartridge holder 32 by hinge 48. Two drill guides 50 are shown so located that when drill jig 46 is in the upright position, drill bits passed through the holes in the drill guides 50 will drill holes precisely in line with the welded seams which adhere mag roller section 40 to toner section 44. This allows even an unskilled worker, using small drill bits, e.g., typically about 0.05–0.10 inches (1.27–2.54 mm) in diameter, to accurately drill out those portions of the welded seams that are to be separated to allow a partial splitting of the cartridge. This drilling action severs the welded seam wherever the drill bit has penetrated. Severing approximately one inch (2.54 cm) of the welded seam from either side of the 4000 series cartridge provides sufficient partial splitting to allow the seal entrance 36 to be spread apart (using various tools, one of which is described below), for the normal insertion of a seal. This sealing process becomes similar to the process described under FIG. 1. In FIG. 2, drill jig 46 is located in front of the normal seal insertion opening. However, some cartridges are welded, not only along the two long lengths of the cartridge but also parallel and adjacent to the seal entrance 36. To remove this impediment, a drilling jig can be precision positioned along a long side of a cartridge holder, drilling through the side of the cartridge seam and along the weld that runs parallel to the seal entrance 36. The drill jig thus used allows an accurate extraction of the welded seam in that area, facilitating the removal or separation of this portion of the original equipment manufacturer cartridge, when required, for inserting a seal.

Figure 3:
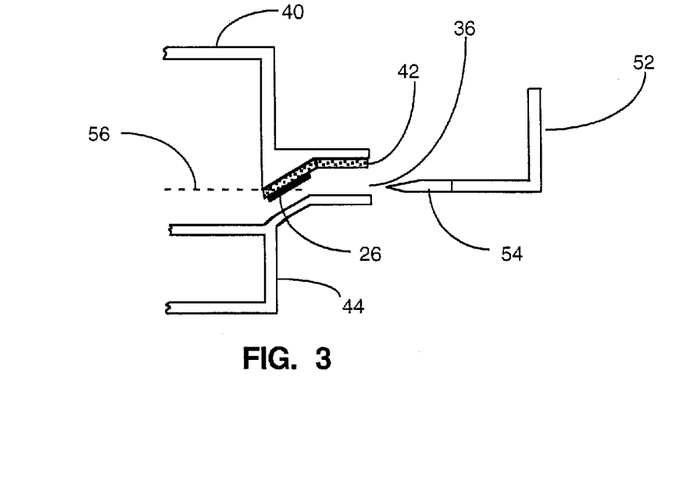
FIG. 3 is a schematic cross-sectional illustration of a seal entrance of a cartridge.

FIG. 3 represents another embodiment for partially splitting this type of cartridge (4000), through the use of two insertion pins, without the necessity of drilling the welded seams. An insertion pin 52, whose width is about 0.125 inches (3.18 mm) but with a narrow portion 54 only about 0.10 inches (2.54 mm) wide (these dimensions chosen to split the seam without tearing the ridges within the cartridge, in the case of the 4000 series cartridge), is inserted in line with the "left" weld 56. Insertion pin 52 is inserted just deep enough to split the welded seam approximately one inch. The remaining nine inches about (23 cm) of the welded seam remains intact. The "right" insertion pin, similar to insertion pin 52, is inserted adjacent to the right side welded seam which enlarges the entrance to the cartridge, and sometimes also partially splits the welded seam. The introduction of the two insertion pins 52 results in the opening of seal entrance 36 enough to allow the insertion of an insertion tool and seal. Since the insertion pins 52 can remain in position when the seal and tool are inserted, these pins are designed so as not to interfere with inserting the seal. These details are discussed below when references to FIGS. 4 through 9 are made.

Whenever a cartridge is partially split, making it possible to enlarge seal entrance 36, or any other area of a cartridge presenting some impediments to a seal insertion, a common aftermath is the possibility of removing or at least cutting away portions of these impediments and removing them permanently. Thus, subsequent resealing of the modified cartridge may not require anymore, or, only insignificant additional effort, to seal a cartridge than is required to seal a cartridge that never had any impediments. With reference to FIG. 2, it is possible to cut away both the portion of the foam gasket 42 (which is covered by plastic tape 26) and the plastic tape 26, with the use of as simple a tool as a putty knife. Improved performance is achieved by sharpening the blade, preferably at a small angle from the original angle so that the blade cuts away the foam gasket 42 and plastic tape 26 serially across their width, not head on.

Other techniques for partially splitting a cartridge is to modify and use any cartridge splitting machinery being marketed, such as the rotary blade machinery described in U.S. Pat. Nos. 5,223,068, 5,407,518, 5,525,183, and 5,676,794 but without fully splitting the cartridge into the two major components, the mag roller section and the toner section. The entire teachings of U.S. Pat. Nos. 5,223,068, 5,407,518, 5,525,183, and 5,676,794 are incorporated herein by reference. Since any splitting mechanism for cartridges can usually be adapted for partially splitting a cartridge, e.g., splitting one inch (25.4 mm), five inches (127 mm) or, whatever is required, of the welded seams permits one to remove or mitigate the effects of impediments to seal insertion and thereby practice this invention. It is understood that the specific techniques and tools utilized will vary from one cartridge model to another, based primarily on the specific impediments the OEM utilizes which must be removed or bypassed.

Figures 4, 5, 6, 7, 8, 9:
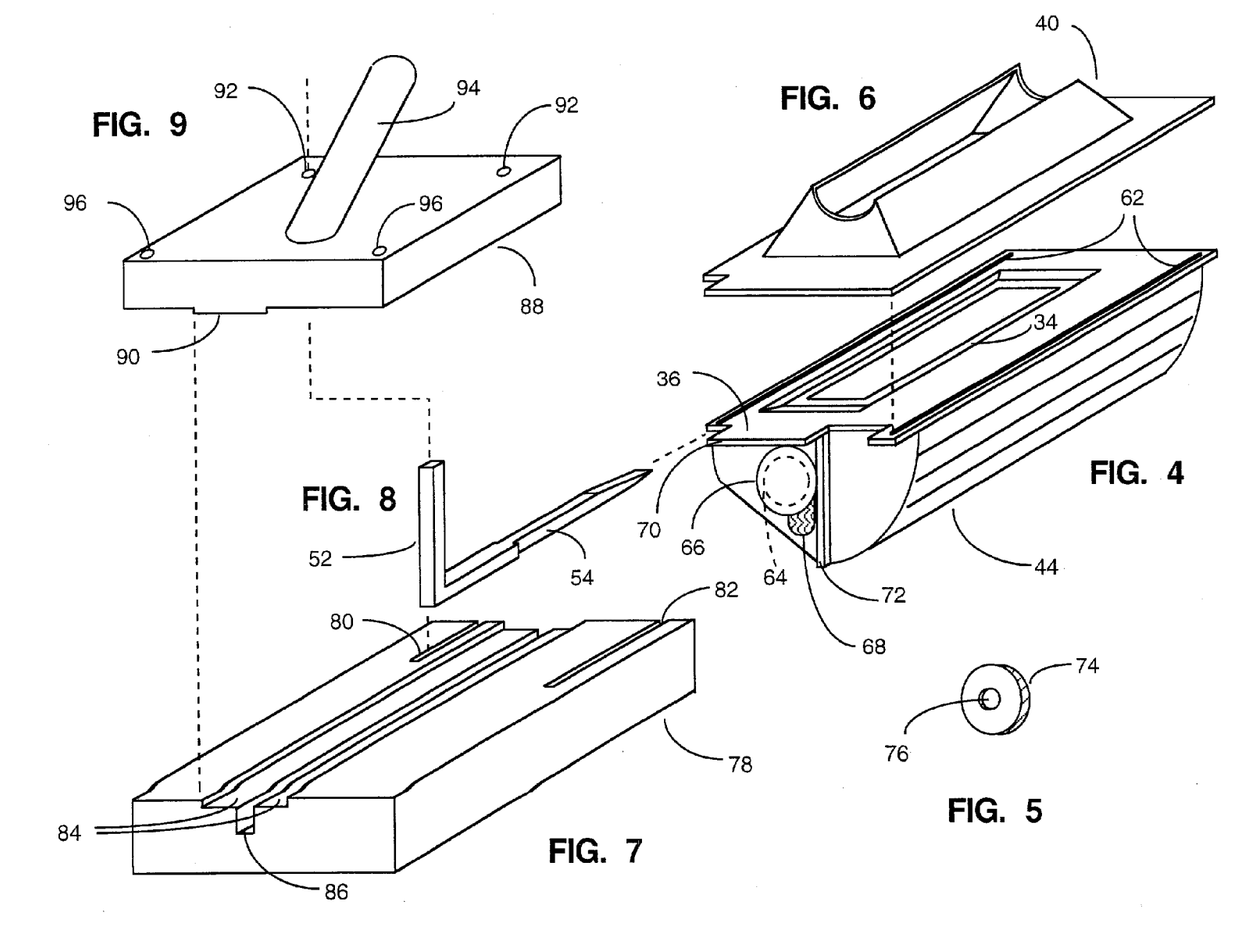
FIG. 4 is a perspective view of a toner section of a toner cartridge.
FIG. 5 is a perspective view of a hole guide.
FIG. 6 is a perspective view of a magnetic roller section of a toner cartridge.
FIG. 7 is a perspective view of a tracking block.
FIG. 8 is a perspective view of an insertion pin.
FIG. 9 is a perspective view of a pin block.

In FIG. 4, toner section 44 is shown with sealing surface 34, which in the 4000 series cartridge, is displaced approximately 0.125 inches (3.18 mm) below the lowest portion of the sealing entrance 36. Welded seams 62 (two illustrated) run adjacent to the two long, outside edges of toner section 44 (as well as along the mating edges of mag roller 40). A 0.75-inch (19.05 mm) fill hole 64 is shown covered by fill cap 66. An area of raised or embossed markings 68 are shown, a portion of which is covered by fill cap 66. While not previously delineated as an impediment, a separate fill hole 64 is necessitated by the fact that the OEM has made the original fill hole (actually, a triangular plug inserted into a raised-edge hole) inaccessible without taking apart much more of the cartridge than is desired. The area where fill hole 64 can be conveniently drilled and the necessity to cover the hole so as not to leak toner requires that the placement of the fill hole 64 and fill cap 66 be accurately positioned and prepared. A preferred method to position the hole and cover using hand tools that are commercially valuable and effective is to use a hole guide 74 shown in FIG. 5. Hole guide 74 is preferentially made of aluminum or steel, and, for the 4000 cartridge, be approximately 1.25 inches (32 mm) in diameter and 0.25 inch (6 mm) thick, with a 0.25 inch (6 mm) diameter hole 76 drilled in its center. The 0.25-inch (6 mm) pilot drill of a 0.75 inch (19 mm) hole saw is inserted into hole 76, and, with the circumference of the hole guide 74 simultaneously touching the sides of toner section lip 72 and toner section lip 70, guides the pilot drill to a position for drilling fill hole 64. As soon as the pilot hole is drilled, hole guide 74 can be removed from the pilot drill of the hole saw, and the 0.75-inch (19 mm) hole can be drilled. A handle and chiseling blade (such as a No. 18 knife blade with heavy duty plastic handle 3205, made by X-ACTO, Speedball Road, Statesville, N.C. 28677), can then be used to deburr the edges of the hole and smooth out the raised or embossed markings 68. Any raised markings 68 under fill cap 66, even if only a few thousandths of an inch (a few tenths of a millimeter) high, can likely cause toner leakage, unless the fill cap 66 adhesive layer is extraordinarily thick and flexible, perhaps three or four times the preferred thickness of about 5 mils (0.13 mm).

In an embodiment of this invention, toner section 44 and mag roller section 40 are initially received welded together, i.e., the cartridge is in the original OEM configuration. To partially separate the cartridge, using the technique of partial splitting via insertion pins, a sequence of actions is usually carried out, although they can vary in some detail, depending on the specific cartridge being partially split and sealed.

FIG. 7 depicts a tracking block 78, normally part of cartridge holder 32 in FIG. 2 and positioned in the general vicinity of drill guide 50. Tracking block 78 provides tracking means 80 and 82 for guiding the insertion pin(s) 52, for guiding the pin block 88 in FIG. 9, and for guiding the insertion tool 18 and seal 16 in FIG. 1. An insertion pin 52 is shown in FIG. 8 in a preferred relative position to seal entrance 36. Only one pin is shown for clarity but another pin, similar in design although usually slightly longer, would normally be used in pin track 82. Insertion pin 52 is shown with a narrower portion 54, designed for the 4000 cartridge to split the seams without tearing or ripping the side wall portions immediately adjacent to the welded seams. The hole(s) 92 of pin block 88 are placed over the insertion pin(s) 52 and pin block 88 is placed on top of tracking block 78. Protrusion 90 of pin block 88 accurately fits into track 84 so that by pushing on handle 94, a significant force can be exerted on insertion pin(s) 52 which are held and guided in tracking means 80 and 82. The insertion pin(s) 52, guided and forced into welded seams 62, partially break the welded seams 62, separating the mag roller section 40 from the toner section 44 in the vicinity of seal entrance 36, sufficiently to allow insertion tool 18 and seal 16 (usually with the use of a foam protector 28) to be readily inserted into seal entrance 36, as if there were no molded extension 38 impeding the normal insertion of a seal. Just prior to the full insertion of the seal/tool combination, insertion pins 52 are withdrawn from welded seams 62, either by using hand force, or more conveniently and sometimes necessary, using the hole(s) 96 placed over pin(s) 52 to conveniently and with reasonable force, remove the pins 52.

Figures 10, 11, 12:
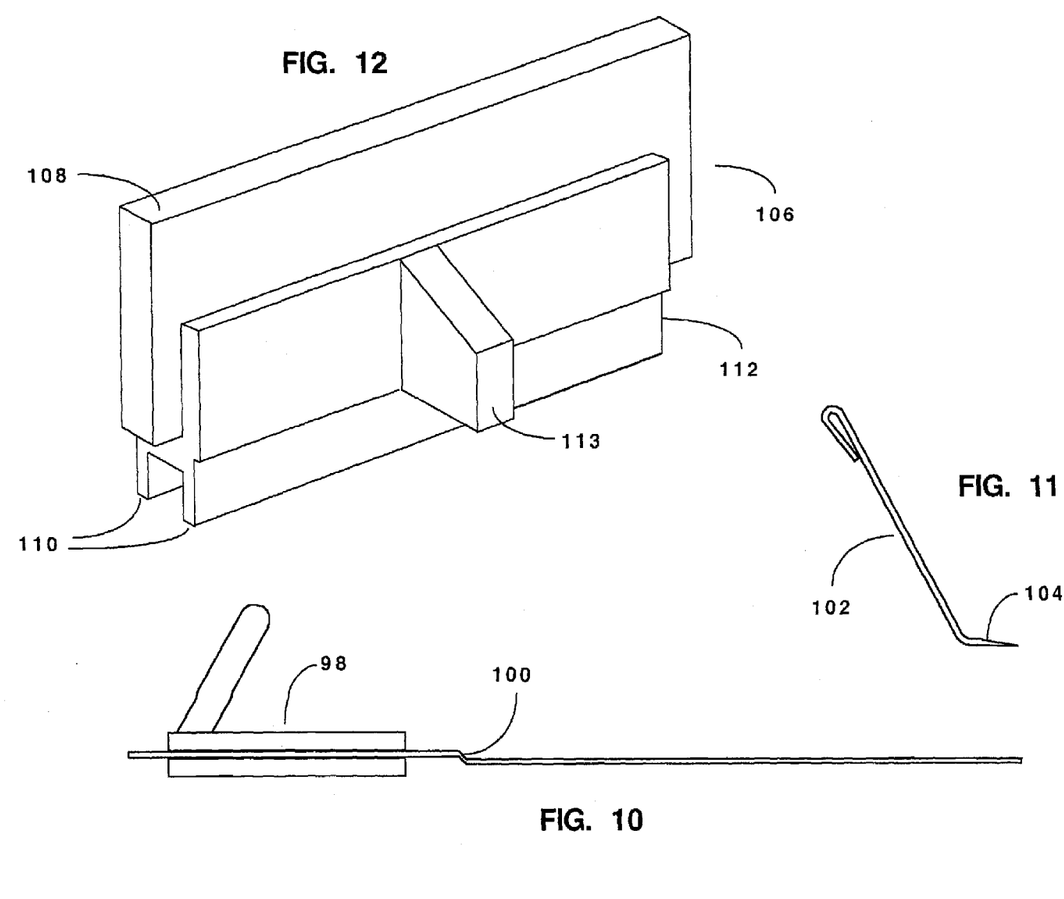
FIG. 10 is a cross-sectional view of an insertion tool having a bend.
FIG. 11 is a cross-sectional view of a pressure pad.
FIG. 12 is a perspective view of a weight pad.

A modification of the normal insertion tool 18 for a preferred embodiment of a 4000 series insertion tool 98, for the purpose of addressing the impediment presented by the difference in the level of the sealing surface 34, a surface which is not in line with the seal entrance 36, is illustrated in FIG. 10. A bend 100 is located so that when this insertion tool 98 has inserted a seal 16, into a 4000 series cartridge (FIGS. 4 and 6), the seal 16 is forced down into contact with the whole of sealing surface 34. To assure truly intimate contact of the seal 16 and sealing surface 34 for the majority of cartridges that are not perfectly flat, two more tools are preferred. Shown in FIG. 11 is a pressure pad 102 (usually used in pairs), and placed on the top of the seal/insertion tool combination after being inserted into the cartridge. The pressure pad 102 is placed through the opening in the top of mag roller section 40 (FIG. 6) and the beveled end 104 is pressed between the mag roller section 40 and the inserted seal/tool combination. A pressure pad 102 is pressed under both ends of mag roller section 40, causing firm pressure between the seal and sealing surface in the vicinity of the pressure pads 102.

Weight pad 106, shown in FIG. 12, is a preferred embodiment for a tool, making possible and/or enhancing the sealing reliability of the 4000 series or similar cartridges. Its purpose is to supply a force on the seal/tool combination along the long directions of the sealing surface 34, similar to the force supplied by pressure pad(s) 102 at the short ends of the sealing surface 34. This force should be applied along the length of the seal 16 in spite of the existence of metal bars directly on top of the seal/tool combination. Weight pad 106 can weigh a little less than two pounds (0.9 kilograms) with most of the weight supplied by the stainless steel bar 108 supported by housing 112. The weight can easily be changed by modifying the dimensions of the stainless steel bar 108. The legs 110 of the housing 112 are designed to span the metal bars and apply the force directly to both edges of the seal/tool combination, both during the time the hot melt adhesive 20 is heated and melted, as well as during the cooling cycle, assuring intimate contact and adherence of the seal 16 to the sealing surface 34. The shape and form of legs 110 are determined by the structure of the opening in mag roller section 40, but it is usually quite narrow in width and long in length. Hence, to ensure that weight pad 106 remains upright and stable and to eliminate the possibility of toppling over when the cartridge (40 and 44), cartridge holder 32 and seal/tool combination are moved for the heating and cooling cycles, support member 113 is designed to just clear the cartridge molding adjacent to the opening through which legs 110 are inserted and prevents any motion that might topple the weight pad 106.

After sealing the cartridge, some form of gasketing is often required to prevent leakage of toner through those areas that were partially split. This leakage can occur after the user has removed the seal and during the time the cartridge is being installed into a printer, or, after installation, when the cartridge is in use. Since the partial splitting process of this invention essentially precludes any relative motion between the mag roller section 40 and toner section 44, the preferred embodiment for sealing these small separations is by the use of a silicone or similar sealant. Examples of suitable sealants are GE RTV100 series of silicone rubber (General Electric Company, 260 Hudson River Road, Waterford, N.Y., USA 12188), generally used with a small metallic or plastic clip at each separation. For more aggressive bonding, which may not require the permanent use of clips, GE RTV5223 has been effective as a bonding and gasket-forming sealant on the plastics presently used in cartridge manufacturing.

Figure 13:
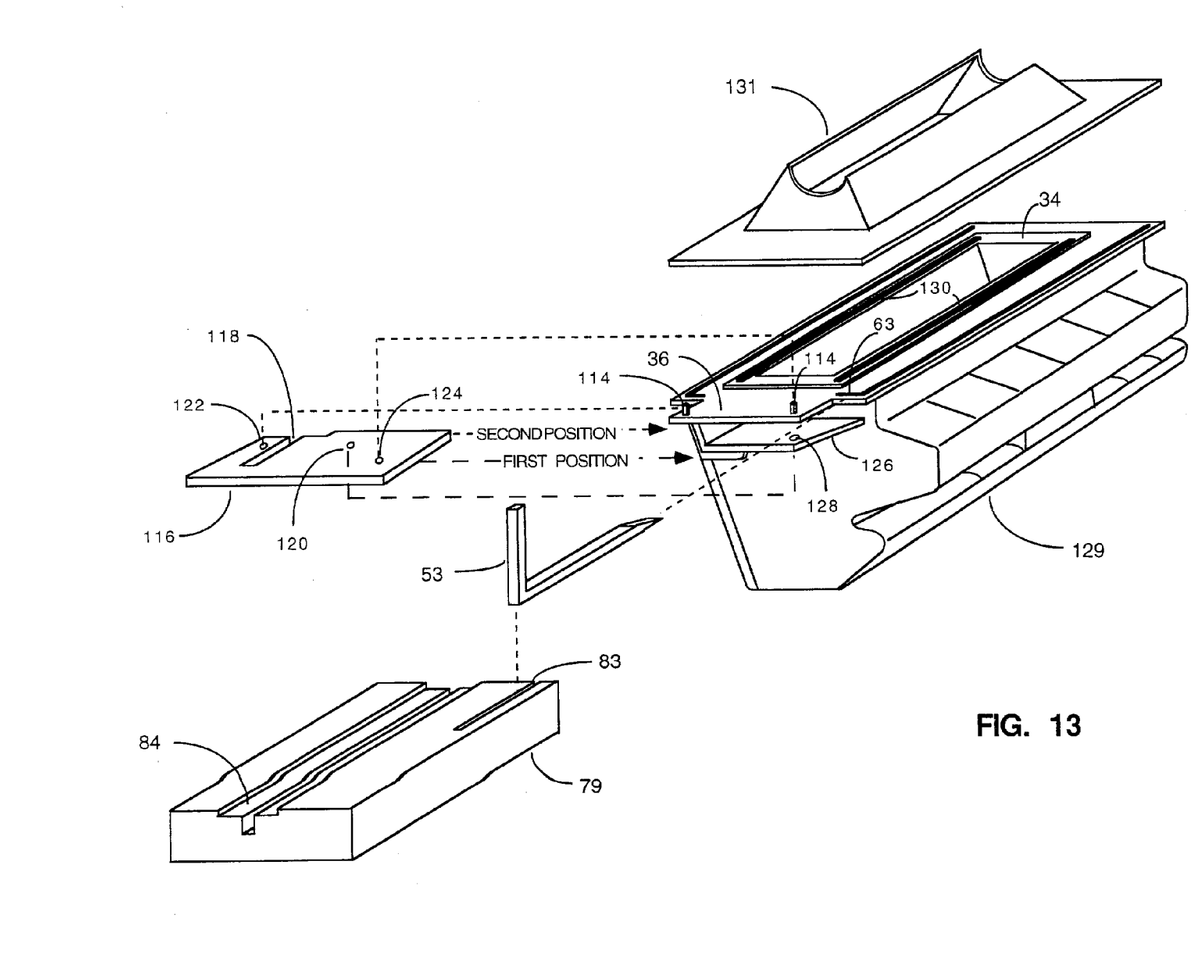
FIG. 13 is an exploded perspective view of another toner cartridge and sealing system.

While the impediments being introduced in the newer cartridges are similar in nature, each cartridge design requires modifications to the techniques and tools used. As another example, the 8000 cartridge is schematically illustrated in FIG. 13. A preferred embodiment in preparing this cartridge for an insertable seal is to first extract the two hidden post impediments 114 (two shown), which are not externally visible or accessible. To accomplish the extractions, pin drill guide 116 is designed with a specific perimeter shape, a slot 118 and drill guide holes 120, 122 and 124, to match the physical configuration of the 8000 cartridge. Pin drill guide 116 is positioned under lower shelf 126 (marked "FIRST POSITION") and held there with small binder clips (not shown). Drill guide hole 120 is thus positioned so that hole 128 can be drilled with a hand drill. The location of hole 128 is precisely in line with the location of hidden post impediment 114. Pin drill guide 116 is then repositioned under the lip of seal entrance 36 (marked "SECOND POSITION") and also temporarily held there with binder clips. Using drill guide hole 122 for positioning a drill, hidden post impediment 114 is drilled and removed without adversely affecting the toner section 129. Likewise, using drill guide hole 124 for positioning a drill, being allowed access by using the previously drilled hole 128, the second hidden post impediment 114 is drilled out. Pin drill guide 116 is then removed for use in a subsequent cartridge. An insertion tool and seal can be inserted into this cartridge, but for the fact that the seal entrance 36 is exceptionally tight, making the snagging and tearing of foam gasket 24, plastic tape 26 (both in FIG. 1) and seal remnants 130 a common and unacceptable occurrence.

As in the previous example of partially splitting a 4000 series cartridge, depicted in FIGS. 4, 6, 7, 8 and 9, a similar procedure is preferred for the 8000 cartridge. Tracking block 79 in FIG. 13 is similar in design to tracking block 78 shown in FIG. 7, except for the absence of pin track 80 and certain dimensional differences due to cartridge differences. While one can use two insertion pins 53 to partially split, it has been found that only one insertion pin 53 is necessary, provided the pin dimensions are properly chosen and the depth of insertion is controlled. Note that insertion pin 53 (FIG. 13) does not have the narrower portion 54 (FIG. 8) since a different welded seam 63 is encountered in the 8000 cartridge verses the 4000 cartridge. Using insertion pin 53 in pin track 83 and pin block 88 (shown in FIG. 9, and not in FIG. 13) either partially splits welded seam 63, and parallel to seal entrance 36, or seal entrance 36 is sufficiently enlarged by the insertion pin 53, allowing for the insertion of foam protector 28, seal 16 and insertion tool 98.

Figure 14:
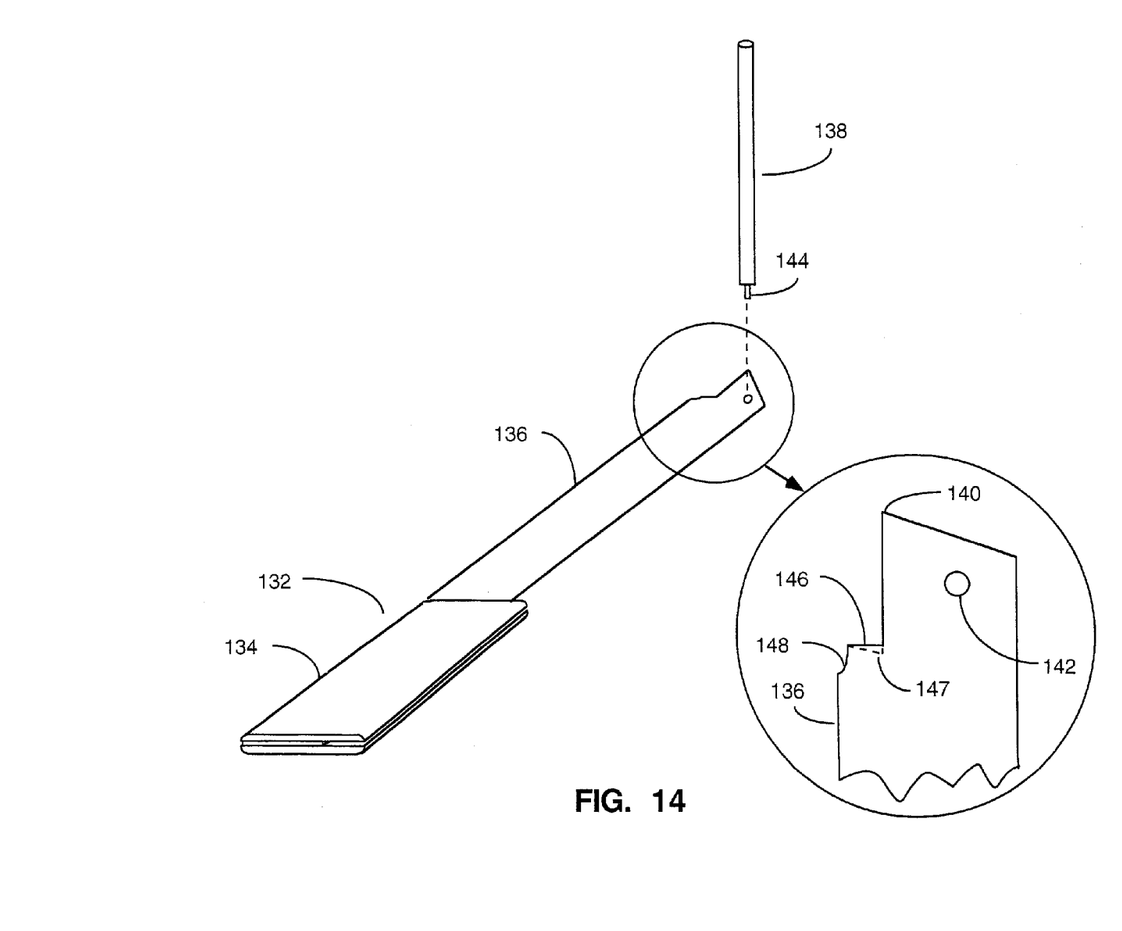
FIG. 14 is a perspective view of a ribbon remover.

In spite of the modification to the 8000 cartridge described above, it has been found that a nearly flawless level of sealing reliability can be achieved if seal remnants 130 are partially or wholly removed prior to sealing. FIG. 14 illustrates how this can be accomplished with the use of ribbon remover 132, composed of handle 134, blade 136 and rod 138. Blade 136, which is narrower than insertion tool track 84 (FIG. 13), is not centered on handle 134, but biased to one side. This structure makes possible the removal of seal remnants 130 from both sides of the cartridge by turning the ribbon remover over. The ribbon remover 132 is used by first inserting a foam protector 28 and sliding blade 136 into the seal entrance 36. The outside edge of blade 136, i.e., the edge that is in line with handle 134, rides against the edge of insertion tool track 84, in line with one of the two seal remnants 130 which is to be removed. With reference to the enlarged view of the tip of the blade 136, apex 140 is inserted under foam protector 28, until hole 142 is visible within the cavity of toner section 129. Rod section 144 is then inserted into hole 142 with enough force on rod 138 to assure that blade 136 is in intimate contact with sealing surface 34. Upon further insertion of blade 136, ribbon ram 146 engages ribbon remnant 130, pushing it into the toner section 129 cavity, where it can be grasped with tweezers, pliers or even one's fingers and removed. With the use of the heat seal sealing system marketed by Provide Technologies, Inc., 10 Packard Avenue, Somerville, Mass., USA 02144, it is not necessary to totally remove the seal remnants 130, because the thick, hot-melt adhesive used in that seal system can readily fill in typical voids or variances in sealing surface 34 and ribbon remnants 130. Ribbon ram 146 is also depicted as a dotted line 147, meant to indicate that the preferred angle of the ribbon ram need not be perpendicular to the direction of the ribbon remnants 130. Another angle cut for the ribbon ram, indicated by the dashed line 147, could help push out the seal remnant 130 into the center of the cartridge opening, depending on the style of weave and other characteristics of the ribbon remnants 130 and their adhesion to the sealing surface 34. The blade curve 148 is a preferred innovation to bypass an impediment, resulting from the presence of a molded plastic ridge attached to the mag roller section 131. With the presence of blade curve 148, blade 136 is pushed towards the center of the cartridge opening, bypassing that impediment but allowing the ribbon ram 146 to engage the seal remnant 130 and removing it from the sealing surface.

Pin drill guide 116 (FIG. 13) is a commercially viable, low-cost tool for accurately guiding a drill bit for the removal of hidden post impediments 114 with a minimum of mechanical or esthetic affects on the cartridge. In a possible future cartridge design, in which the use of such a tool would be difficult, a preferred embodiment for removing hidden post impediments 114 can utilize a somewhat similar pin drill guide 116 but designed to be placed on the top surface of mag roller section 131, with a general location over the seal entrance 36. This would result in holes visible to the customer, which could be disguised with fillers or caps or other, more complex molded components. It is apparent that any preferred embodiments for tooling are primarily determined by the specific design of the OEM cartridges and by the level of professional finish and appearance demanded by the remanufacturer and final customers.

Figure 15:
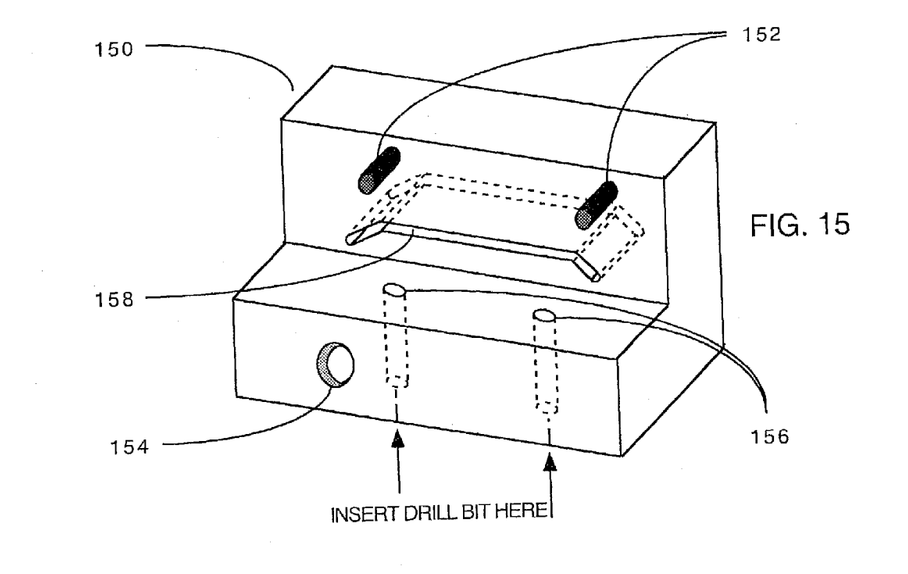
FIG. 15 is a perspective view of a drill block.

A preferred embodiment for sealing the recently introduced 8100 cartridge utilizes drill block 150, shown in FIG. 15. This is a schematic representation of a device which facilitates the guiding or positioning of appropriate tools for the removal of two pins and a molded extension that interfere with the insertion of a seal into the 8100 cartridge. Locator pins 152, in conjunction with bored hole 154 match existing holes and a protrusion, respectively, molded at the end of an 8100 cartridge, and are used to precisely locate the drill block 150 at the end of an 8100 cartridge which is being resealed. Drill block 150 is machined with tolerances that readily allow the remanufacturer to position drill block 150 within approximately 0.004 to 0.008 inches (0.1 to 0.2 mm) of the desired location at the seal insertion end of the 8100 cartridge. With the drill block 150 so positioned, a rotary power tool with a jeweler's cutter, such as manufactured by The Foredom Electric Company in Bethel, Conn., U.S.A., is inserted into slot 158, the tool bit exiting the slot 158 where 158 is indicated in FIG. 15. By moving the rotary power tool along the trajectory defined by the slot 158, allowing the smooth portion of the jeweler's cutter to ride along the slot 158 as a bearing surface, the molded extension, somewhat similar to molded extension 38 in FIG. 2, can be removed. Subsequently, without moving the drill block 150 position, and preferably using a 0.25 inch (6.35 mm) "special drill", part number 8123, (manufactured by Provide Technologies, Inc. of Somerville, Mass., U.S.A.), inserted through the holes 156, and into the 8100 cartridge where the two plastic posts, proximate to the seal entrance of the cartridge are located, (somewhat similar to the post impediment(s) 114 in FIG. 13), are completely removed without adversely affecting the appearance or performance of the cartridge.

While the ribbon remnants 130 remaining within the 8100 cartridge (now using FIG. 13 also as a schematic representation of the 8100 cartridge) after the original seal has been removed appear similar to the ribbon remnants 130 of the 8000 cartridge shown in FIG. 13, they are composed of different materials. The ribbon remnants 130 in the 8100 cartridge are of a metallic composition and those in the 8000 are a textile composition. The significance is that metallic ribbon remnants can not readily be partially or completely removed, without affecting the smoothness of the sealing surfaces 34 and the reliability of the seal. Therefore, the preferred embodiment for inserting a seal into an 8100 cartridge, after the two posts and molded extension referred to in the previous paragraph are removed, is to temporarily cover the ribbon remnants 130. This temporary covering of the ribbon remnants 130 can be achieved by using two ribbon protectors 160 (one shown) in FIG. 16 as a cover for the ribbon remnants 130 when a seal-tool combination is to be inserted.

Figure 16:
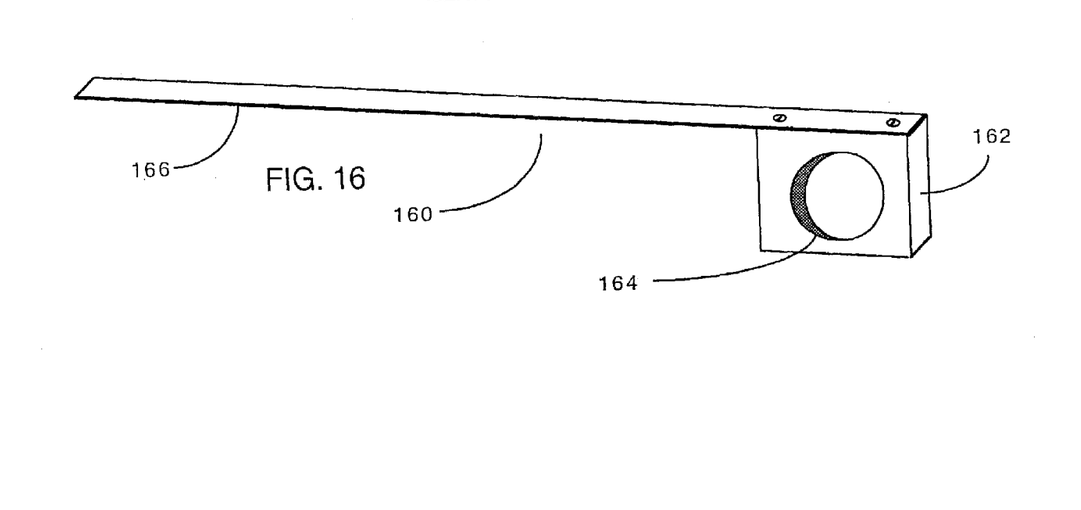
FIG. 16 is a perspective view of a ribbon protector.

A preferred embodiment of a ribbon protector 160 can include handle 162 with a hole 164 providing a convenient finger hold for pulling on handle 162, which is attached to a narrow, typically 0.375 inches (9.5 mm) wide, and thin, typically 0.005 inches (0.127 mm) thick, steel blade 166. A ribbon protector 160 is installed by inserting a foam protector 28, whose width is approximately 0.9 inches (23 mm) and then sliding this narrow foam protector 28 under the foam gasket 24 and plastic tape 26, the objective being the avoidance of any contact with ribbon remnants 130. One of the ribbon protectors 160 is then inserted under the foam protector 28 with the tip of the steel blade 166 slightly lifted and pulled over onto the top of one of the ribbon remnants 130. The ribbon protector 160 is then straightened out to line up with the ribbon remnant 130. Then the second ribbon protector 160 is inserted similarly to the first one, but pulled over the second ribbon remnant 130 and straightened out. While the steel blade 166 is approximately sixteen inches (40.6 cm) long, only one to two inches (2.5 to 5 cm) of the ribbon remnants 130 need be covered by the ribbon protectors 160. The rest of the steel blades 166 rest in tracks (not shown) in tracking block 79 parallel to the insertion track 84 (FIG. 7 and FIG. 13) which conveniently retain the ribbon protectors 160 in position. Then, a wide foam protector, approximately 1.75 inches (4.45 mm) is inserted under the previously inserted narrow foam protector and on top of the ribbon protectors 160, and then removing the narrow foam protector. Through this process, the wide foam protector 28 covers the foam gasket 24 and plastic tape 26 and the ribbon protectors 160 cover the ribbon remnants 130 so that a seal/tool combination can readily be inserted into the 8100 cartridge. The ribbon protectors 160 are removed by pulling on finger hole 164 soon after the seal/tool combination have been inserted about two inches (five cm), i.e., beyond the beginning of the ribbon remnants 160. The seal/tool combination is then fully inserted and the tool is heated and cooled to produce a sealed 8100 cartridge without splitting the cartridge.

Drill block 150 is an embodiment of a drill-guide that accomplishes the tasks of enabling the same guide to accommodate the removal of impediments in two planes of the cartridge. It is apparent that the original equipment manufacturers could possibly design more complex cartridges, making the preferred embodiments for removing the impediments not amenable, acceptable or possible to the tool designs described herein. In these events, the preferred embodiments for removing or bypassing impediments to the insertion of viable seals will likely be through the use of milling machine-like techniques, albeit, simple milling machine designs. Specifically, since only plastic materials are likely to be removed, a cartridge holder can be constructed with guide rods surrounding all four sides and the top to which an adjustable motor mount with motor is attached. These can be "home made" or commercially purchased, allowing one to drill, mill or saw away any part of a cartridge or impediment, and practice the teachings of this invention.

It will be understood that the inventions may be embodied in other specific forms without departing from the spirit or central characteristics thereof. The present examples and embodiments, therefore, are to be considered in all respects as illustrative and not restrictive, and the inventions are not to be limited to the details and claims given herein.

What is claimed is:

1. A method for preparing a toner cartridge for reconditioning and resealing with a replacement seal, comprising:
    a) providing a used toner cartridge whose seal has been removed and the toner has been essentially consumed with the toner cartridge substantially otherwise intact;
    b) penetrating by drilling, milling, cutting or sawing said toner cartridge so as to remove, modify or bypass any impediments present which interferes with the resealing of said toner cartridge without fully splitting said toner cartridge; and
    c) securing the replacement seal with an adhesive to said toner cartridge.

2. The method of claim 1 wherein the replacement seal is inserted with a replacement seal insertion tool into the toner cartridge, wherein said insertion tool includes a blade having a first portion of said blade in a first plane and a second portion of said blade in a second plane that is different from said first plane.

3. The method of claim 1 wherein the drilling is guided by a hole guide.

4. The method of claim 1 wherein said impediment includes a weld in the interior of the cartridge.

5. The method of claim 1 wherein said impediment includes a post in the interior of the cartridge.

6. A method for preparing a toner cartridge for reconditioning and resealing with a replacement seal, comprising:
    a) providing a used toner cartridge having a seal removed from an original seal position;
    b) removing an impediment in the used toner cartridge by drilling, milling, cutting or sawing wherein said impediment interferes with insertion of a replacement seal insertion tool into the toner cartridge for resealing with a replacement seal without fully splitting said toner cartridge;
    c) inserting the replacement seal with the replacement seal insertion tool into the toner cartridge; and
    d) removing the replacement seal insertion tool from the toner cartridge while leaving the replacement seal attached in a sealing position with an adhesive, thereby resealing the toner cartridge.

7. The method of claim 6 wherein the drilling is guided by a hole guide.

8. The method of claim 6 wherein said impediment includes a weld in the interior of the cartridge.

9. The method of claim 6 wherein said impediment includes a post in the interior of the cartridge.

10. The method of claim 2 wherein the first plane and the second plane of the blade of the insertion tool intersect to form a bend in the blade.

* * * * *